Figure 3:
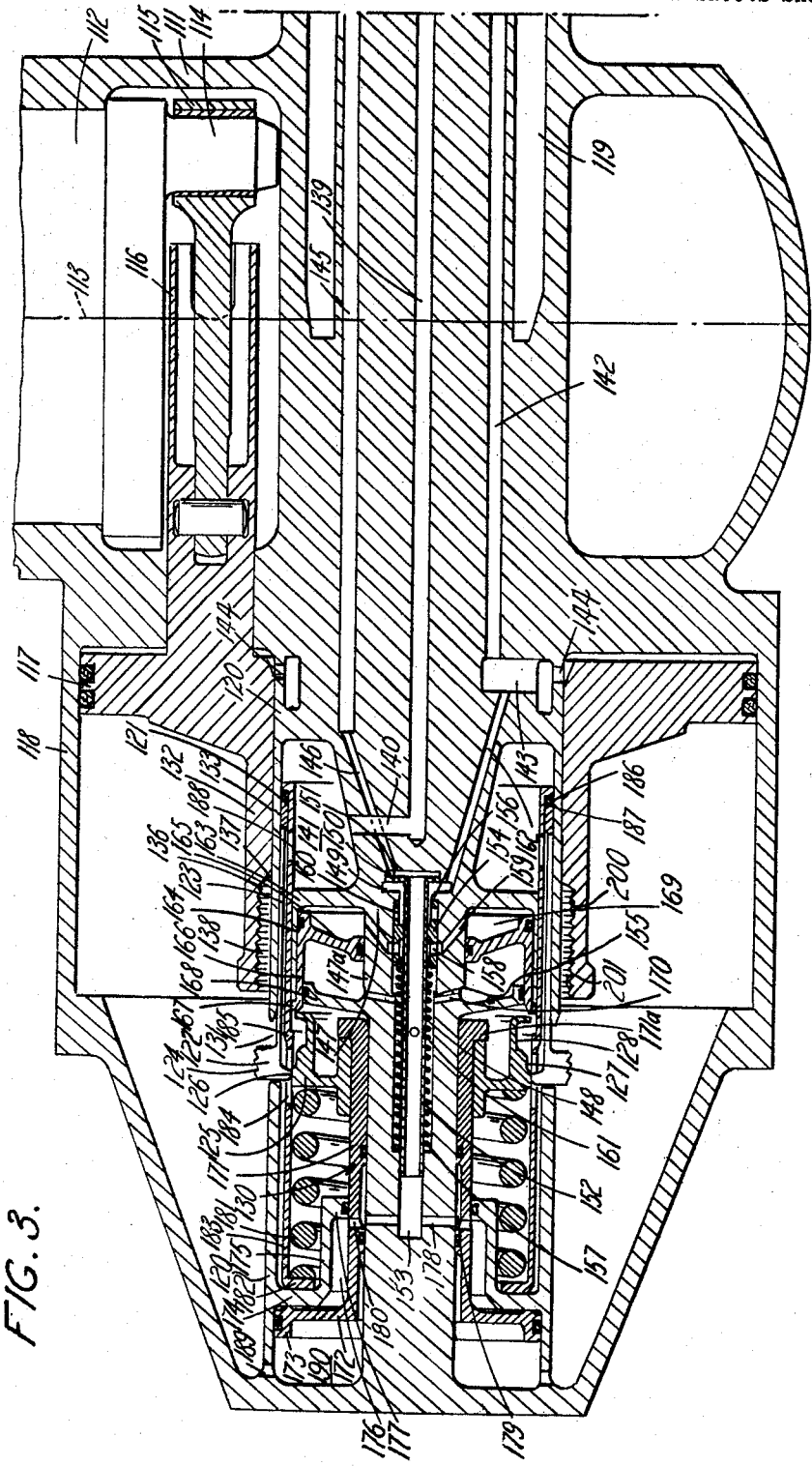

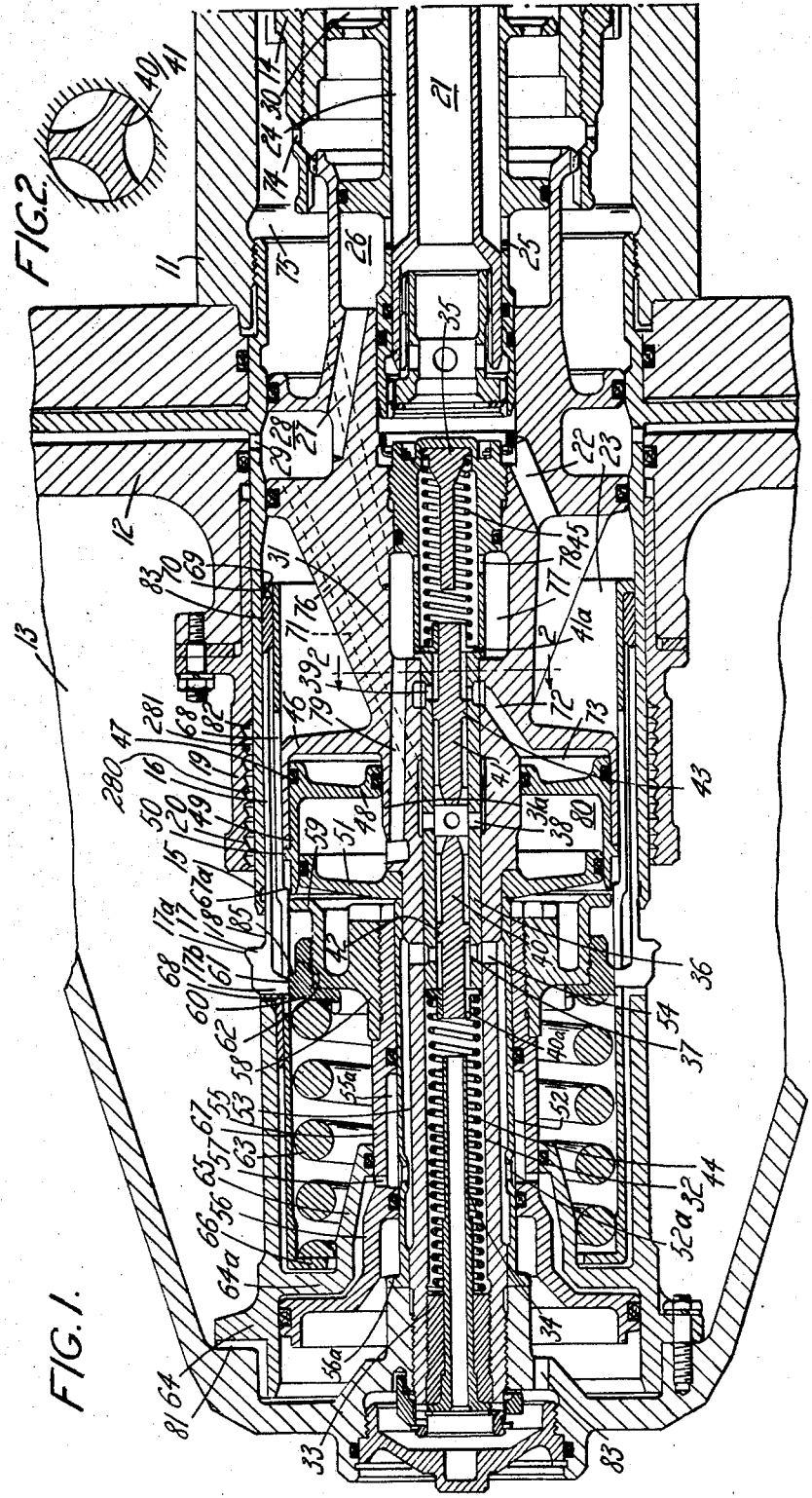

United States Patent Office 2,903,075
Patented Sept. 8, 1959

2,903,075

VARIABLE PITCH AIRSCREWS

Thomas Edward Godden and Edward Hollingworth Morris, Gloucester, England, assignors to Rotol Limited, Gloucester, England, a British company Application September 19, 1955, Serial No. 535,071

Claims priority, application Great Britain September 24, 1954

15 Claims. (Cl. 170—160.32)

This invention relates to variable pitch airscrews of the kind, hereinafter referred to as of the kind described, having a pitch change motor comprising two elements movable relatively to one another by hydraulic fluid pressure to adjust the blades of the air screw in a desired range of pitch angles. With airscrews of this kind, the pitch change motor usually operates under the control of constant speed mechanism.

It has been found that a serious disadvantage with airscrews of the kind referred to is that if the fluid pressure supply to the pitch change motor fails during operation of the propeller, then the propeller blades are uncontrolled and move in the pitch fining direction due to the centrifugal forces acting upon them. In propeller turbine power plants particularly, such fining off of the propeller blades causes overspeeding of the engine and possible damage to the turbine due to the extremely high centrifugal loading encountered.

The main object of the invention is to provide a variable pitch airscrew in which such fining off movement on failure of the fluid pressure supply to the airscrew is either prevented, or limited to a small amount.

Accordingly the invention provides a variable pitch airscrew of the kind described, said airscrew having a locking mechanism to lock the elements of the pitch change motor against movement relatively to one another corresponding to movement of the blades in the pitch fining direction into fine pitch, which locking mechanism is normally maintained in an inoperative state at least during controlled pitch changing movements of the blades in the pitch fining direction, but changes automatically to an operative state on such release of the fluid pressure supply to the motor that the blades tend to move uncontrolled in the pitch fining direction.

Preferably said locking mechanism is also normally maintained in an inoperative state during controlled pitch changing movements of the blades towards coarse pitch.

According to a feature of the present invention said locking mechanism may be maintained in its inoperative state by fluid pressure the maintenance of which is dependent upon the maintenance of a predetermined minimum pressure on the fine pitch side of the pitch change motor so that the locking mechanism is brought to its operative state when the pressure of fluid on the fine pitch side of the pitch change motor falls below said predetermined minimum value and in this case it is preferred that the locking mechanism be maintained in its inoperative state by the fluid pressure existing on the fine pitch side of the pitch change motor during all phases of normal operation of the airscrew so that the locking mechanism is brought to its operative state only by a reduction of the fluid pressure on the fine pitch side of the pitch change motor below a normal operating minimum value. The pitch change motor generally comprises a ram and cylinder and in this case, according to another feature of the invention, the locking mechanism may comprise a series of shoulders on said ram spaced apart in the direction of relative movement of said ram and cylinder, a stop movable between an inoperative position out of the path of movement of said series of shoulders during relative movement of the ram and cylinder and an operative position in said path, and stop retaining means which in a first position relative to said stop engages and holds said stop in the path of relative movement of said shoulders, and in a second position relative to said stop allows said stop to be moved to its inoperative position.

According to another feature of the present invention, said stop retaining means may be displaceable between its said first position relative to said stop and its said second position relative to said stop against the action of a spring urging the stop retaining means into its said first position, and hydraulic jack means may be provided, which jack means is actuable by the fine pitch fluid pressure maintaining the locking mechanism in its inoperative state to override said spring and move said stop retaining means to its said second position relative to said stop.

Preferably said retaining means is shaped to ensure that said stop has moved to its operative position when said retaining means has changed its position relative to said stop from its said second position relative to said stop to its said first position relative to said stop, and in this case, according to another feature of the present invention, each shoulder of said series of shoulders may have a first shoulder surface to engage said stop when it is in its operative position to prevent movement of the ram relative to the cylinder of the pitch change motor to move the blades in the pitch fining direction, and a second shoulder surface, opposed to the first shoulder surface, to engage and displace the stop against the action of said spring, when said locking mechanism is in its operative state and when the ram is moved relatively to the cylinder of the pitch change motor to move the blades towards coarse pitch, to change the position of said stop retaining means relative to said stop from its said first position relative to said stop to its said second position relative to said stop, each of the second shoulder surfaces being so shaped and disposed that the relative movement of the ram forces the stop to its inoperative position against the action of said spring when said stop is displaced as aforesaid so that said stop disengages the second shoulder surface of each of said shoulders in turn and is re-engaged with the second shoulder surface of the next adjacent shoulder by the action of said spring which returns said stop to change the position of said stop retaining means from its said second position relative to said stop to its said first position relative to said stop. By the arrangement just described it is ensured that the locking mechanism, when it is maintained in its operative state preventing relative movement of the ram and cylinder of the pitch change motor corresponding to movement of the blades in the pitch fining direction is, nevertheless, ineffective to prevent relative movement of the ram and cylinder of the pitch change motor to move the blades in the pitch coarsening direction. This, for example, would follow a failure of the normal pitch control oil supply, and automatic locking of the blades against uncontrolled movement in the pitch fining direction, high pressure oil being delivered to the coarse pitch side of the pitch change motor from a separate feathering pump to move the blades to a feathered position.

Two embodiments of the present invention will now be described merely by way of example, with reference to the accompanying drawings whereof:

Figure 1 shows, in cross-section, an hydraulic variable pitch airscrew in accordance with the present invention, Figure 2 shows a partial section on line 2—2 in Figure 1, and Figure 3 shows another hydraulic variable pitch propeller in accordance with the present invention.

Referring to Figures 1 and 2 of the drawings, the airscrew comprises a hub 11 upon which are journalled the blades (not shown) for rotation about their longitudinal pitch change axes. Each blade is coupled at its root to a connecting rod (also not shown) which in turn is coupled to a ram 12 sliding in a cylinder 13 arranged co-axially with the driving shaft 14 in the forward part of the hub 11, this ram and cylinder forming a pitch change motor and the ram being slidable forwardly of the hub (i.e. to the left in Figure 1) to move the blades in the pitch fining direction and rearwardly of the hub (i.e. to the right in Figure 1) to move the blades in the pitch coarsening direction. The ram 12 is of annular form and slides on a stationary barrel 15 which is arranged co-axially with and within the outer wall of the cylinder 13 and which houses the retractable locking mechanism according to the invention. This mechanism comprises a ring of resilient inspringing fingers 16, each finger having a stop or abutment 17 integral with its forward end, the fingers 16 forming spring means resiliently urging the stops 17 to an inoperative position later described. The stops 17 project through a circumferential gap 18 in the wall of the barrel 15 into the path of the ram 12. The ram comprises on its forward side a sleeve member 19 the internal diameter of the forward portion of which is a little larger than the outside diameter of the barrel 15 with which the sleeve member is concentric. The inner periphery of this portion is provided with a number of circumferential V-sectioned grooves 20 between V-sectioned shoulders or ridges, the slope of the forwardly facing shoulder surfaces 280 being greater than the slope of the rearwardly facing shoulder surfaces 281. At the rearmost groove 20 the internal diameter of the sleeve 19 is reduced to that of the outer surface of the barrel 15 so that, at its rearward end the sleeve is a sliding fit on the barrel 15. Each of the stops 17 has a radially outer part or formation 17a which is shaped to conform with the contour of the grooves 20.

A channel 21 concentric with the driving shaft 14 passes through the centre thereof into the propeller hub.

This channel is used to convey coarse pitch pressure fluid to the forward side of the ram 12 of the pitch change motor via a channel 22, annular chamber 23 and through the clearance between the resilient fingers 16 and through the gap 18 to move the ram 12 in the pitch coarsening direction.

Surrounding channel 21 is an annular channel 24 which is used to convey fine pitch pressure fluid to the rearward side of the ram 12 via ports 25, annular chamber 26, passages 27, annular chamber 28 and ports 29, to move the ram in the pitch fining direction.

A third channel 30 surrounds channel 24 which is used to convey hydraulic fluid at drain fluid pressure.

A core 31 supported co-axially with and within the barrel 15 is provided with a bore 32 which is concentric with the driving shaft 14. At its forward end this bore is provided with a plug 33 having an opening through which a tube 34 passes rearwardly into the bore. The rearward end of the bore is blanked by a member 35 which extends into the bore, and which is reduced in diameter at its forward end to form a rod-like part.

At its centre part the bore 32 is provided with a sleeve 36 having three sets of ports 37, 38 and 39. This sleeve is fixed with respect to the bore and houses two valve members 40 and 41 which are each provided with a land 42 and 43 respectively. As will be seen from the scrap section in Figure 2 each valve is on both sides of its land cutaway to leave three equispaced radially extending parts a, b and c which form bearing surfaces at the spring end of the valve, while the cutaway parts permit the passage of pressure fluid as far as the lands. Each valve member is provided with a radial flange 40a and 41a respectively towards its end. These flanges which like the valve-members are also cutaway respectively form seatings for valve spring means in the form of coil springs 44 and 45. The forward end of spring 44 seats against the plug 33 and the spring surrounds the tube 34. The rearward end of this tube forms a stop for the forward end of valve 40. The rearward end of spring 45 seats against the blanking member 35. This spring surrounds the inwardly extending rod-like part of this blanking member, the extreme forward end of which acts as a stop for the rearward end of the valve 41.

Integral with the outside of the core 31 at its centre part is a radial flange 46 having a forwardly axially extending cylindrical part 47 at its periphery. The outer surface of the core 31 is cylindrical at its centre part 31a and an annular piston 48 is slidingly mounted thereon and within the cylindrical part 47. This annular piston is provided with a forwardly axially extending cylindrical part 49 at its periphery, and the part 49 has a radially outwardly extending flange 50 which forms a stop for the piston when it abuts against the forward extremity of the cylindrical part 47. A suitable distance forward of the flange 46 is a flange 51 fixed with respect to the core 31, which supports the cylindrical part 49 and with it forms an enclosed cylindrical chamber 80 in which the piston 48 is reciprocable, the chamber 80 and the piston 48 forming an hydraulic jack means actuable to move the stop retaining means later described to its inoperative position as also later described.

Towards the forward part of the core 31 the core is provided with an annular chamber 53 formed between a sleeve 52 and an inner part of the core. The core is provided with radial ports 54 in line with the ports 37 in the sleeve 36, and the sleeve 52 is provided with radial ports 52a towards its forward end. Slidingly mounted on this sleeve 52 is a cylindrical member 55 having a forwardly extending substantially frusto-conical part 56. The inner periphery of the member 55 is provided with a recess 55a. Radial ports 57 are provided in this member towards its forward end, which ports open into the recess 55a. To the rearward end of the member 55, is secured a circular member 58 provided towards the rear end thereof with a radially extending flange 59 around its periphery. This member is also provided with a ring 60 having a cylindrical stepped outer periphery having two steps diameters 61 and 62 respectively, the steps being separated in the axial direction of the hub by a rearwardly facing sloping surface 85. The diameters 61 and 62 co-operate with inwardly projecting parts 17b of the stops 17 as later explained.

Towards the forward part of the cylinder 13 there is provided in its interior a part 64 with a radially inwardly extending flange 64a. The internal diameter of this flange is approximately equal to the mean diameter of the frusto-conical part 56. Integral with the flange at its inner diameter is a rearwardly extending frusto-conical part 65 the smaller diameter of which supports the member 55 with clearance so that the latter may slide therethrough. It will be seen that the frusto-conical part 56 forms a piston which is reciprocable in a cylinder bounded at its forward end by the hub cap of the airscrew and at its rearward end by the flange 64a and the frusto-conical part 65. This piston is coupled to the circular part 58 by the cylindrical member 55, the piston, member 55, part 58 and ring 60 forming a stop retaining means displaceable from its position shown in Figure 1 forwardly against the pressure of a spring 63, which movement permits the stops 17 to spring from the diameter 61 of the ring 60 onto the diameter 62. The forward end of spring 63 seats against an inwardly directed flange 66 which is formed at the foremost extremity of a sleeve 67. The sleeve 67 surrounds the stop retaining means and at its rear end is received within a ring 83 which carries the resilient fingers 16 and which is slidable within the barrel 15. The sleeve is provided with slots as at 68 through which pass the parts 17b of the stops 17 to cooperate with the stepped ring 60 and the sleeve is stepped and increased somewhat in diameter halfway along its length. This step 67a co-operates with the radial flange 50 to limit the forward movement of the piston 48. At its rearmost end member 67 is provided with radially extending projections 69 which interengage with slots 70 at the rearmost edge of the ring 83. As may be seen from Figure 1 the fingers 16 project from the ring 83 forwardly of the barrel 15 i.e. from the foremost edge of the ring, and the ring 83 and sleeve 67 are together slidable rearwardly against the pressure of the coil spring 63.

The rear part of the core 31 is increased in diameter and channels 71 therein lead from the annular chamber 28 to the ports 38 in the sleeve 36. Further channels 72 in the core lead from the ports 39 to the chamber 73 on the rearward side of piston 48. The drain channel 30 communicates via ports 74, annular chamber 75, channel 76 in the core 31, annular chamber 77 and ports 78 with the bore 32 on the rearward side of valve 41. A channel 79 also leads from annular chamber 77 to the chamber 80 on the forward side of piston 48.

Part 64 is provided with radial grooves 81 which place the forward side of the ram 12 and the forward side of the piston 56 in communication.

The operation of the airscrew will now be described. As shown in the drawing the ram 12 is in the maximum coarse, i.e. feathered position. When it is desired to move the blades of the airscrew into the normal operating pitch change range of movement the coarse pitch oil which has been delivered by a feathering pump, is relieved and a propeller control (not shown) is adjusted so that a constant speed unit permits fine pitch oil at a pressure appropriate for moving the blades in the pitch fining direction to pass via channel 24, ports 25, chamber 26, channel 27, chamber 28 and ports 29 to the fine pitch side of the pitch change motor so as to move the ram in the forward direction corresponding to movement of the blades in the pitch fining direction the oil on the coarse pitch side of the pitch change motor exhausting to drain via the gap 18, slots 68, annular chamber 23, channel 22 and channel 21. At the same time fine pitch oil at a corresponding pressure passes through channels 71 and ports 38 to the rearward and forward side of valves 40 and 41 respectively.

Spring 44 forward of valve 40 is however somewhat stronger than spring 45 behind valve 41 and normal fine pitch pressure appropriate for pitch fining movement is not high enough to overcome the pressure of spring 44. Under normal operating conditions however, by which is meant operation of the propeller under the control of a constant speed unit, valve 41 is moved against the action of the spring 45 by the pressure acting in the fine pitch side of the pitch change motor regardless or not of whether this pressure is sufficient to bring about pitch changing movement in the pitch fining direction, this pressure being maintained above a predetermined minimum value during normal operation of the airscrew in any known or convenient manner. As valve 41 is moved rearwardly against spring 45 its land 43 moves past the ports 39 closing them to drain oil pressure (from conduit 30) and opening them to fine pitch oil which passes through ports 39 and passage 72 into chamber 73. It will be understood that drain oil pressure is continuously maintained in chamber 80.

The fine pitch oil in chamber 73 overcomes the drain oil pressure in chamber 80 and the piston 48 moves forward and its forward extremity abuts against the flange 59 of circular member 58. Piston 48 together with member 58 then moves further forward against the pressure of coil spring 63 until the flange 50 abuts against the stop 67a. Because valve 41 is always open under normal conditions the piston 48 is held forward against this step and the inwardly projecting parts 17b of the stop 17 have moved from their first position in which they rest upon the diameter 61 of the ring 60 to their second position in which they rest on diameter 62 of the ring 60. The ram 12 is therefore free to move in either direction along the barrel 15, the tips of the V-sectioned formations 17a being sufficiently retracted to permit this. This movement is under the control of the constant speed unit, the limit in the fine pitch direction being imposed by the fine pitch stop formed by the formations 17a striking the shoulder surface 82. This limit corresponds to the propeller blade take-off angle and the blades must be prevented from fining off below this position in flight.

On landing the fine pitch pressure is allowed to rise in known manner by gagging a fine pitch pressure relief valve and thus move valve 40 forwardly against the pressure of spring 44. The land 42 moves past the ports 37 closing them to the coarse pitch side of the valve and opening them to fine pitch oil which passes through these ports and ports 54, annular chamber 53, ports 52a and ports 57 to the rearward side of piston 56. In this way piston 56 and circular member 58 move further forwardly against the pressure of coil spring 63 so that the abutments 17 are able to spring inwardly from diameter 62. Thus the ram 12 is permitted to move forward over the now fully retracted formations 17a into superfine, super-superfine or reverse pitch. Forward movement of the piston 56 is limited by the abutment 56a.

Failure of the drive to the constant speed unit or failure of either coarse or fine pitch oil line 21 or 24 during normal operation resulting in the pressure of fluid on the fine pitch side of the pitch change motor falling for example to drain pressure, i.e. below its normal operating minimum value above which it is able to maintain the locking mechanism in its inoperative state, causes valve 41 to close and vent space 73 to drain. Spring 63 then moves circular member 58 and ring 60 rearwardly thus forcing the stops 17 radially outwardly so that the V-sectioned formations 17a engage one of the shoulder surfaces 280 on the sleeve 19, if not immediately, then as soon as the blades have fined off to an extent sufficient to bring the first shoulder surface 280 against the stops.

This prevents any movement or further movement of the ram 12 in the pitch fining direction which might otherwise occur due to the natural tendency of the airscrew blades to move into fine pitch, and thereby provides a means to prevent overspeed of the power plant.

If, following such a failure, and consequent operation of the locking mechanism it is required to move the blades of the airscrew towards coarse pitch in order to feather the blades, fluid pressure is supplied from a feathering pump to the conduit 21 and coarse pitch pressure oil passes from conduit 21 through channel 22, annular chamber 23, slots 68, through the clearance between the resilient inspringing fingers 16 and gap 18 to the forward side of the ram 12. Coarse pitch oil also passes therefrom via grooves 81 to the forward side of piston 56 and also to the rearward side of this piston via ports 83, tube 34, the cutaway parts of the valve 40 between the radially extending projections a, b and c, ports 37, 54, annular space 53, ports 52a and ports 57. Since the locking mechanism is in its operative state the valve 41 is in its forward position in which the flange 41a abuts against the rear end of sleeve 36 under the pressure of coil spring 45, and port 39 is open to drain oil pressure. Thus the pressures are substantially balanced on each side of piston 48 and on either side of piston 56.

The coarse pitch pressure acting on the forward side of the ram 12 therefore displaces the ram to the right in Figure 1 together with the stops 17 with which it is engaged, the stops 17, the ring of fingers 16 the collet ring 83 and the sleeve 67 all moving rearwardly against the action of the spring 63, which is compressed between the flange 66 and the ring 60 until the inwardly projecting parts 17b of the stops 17 clear the larger diameter 61. When this happens the shoulder surface 281 of the groove 20 in which the formations 17a are engaged by virtue of its shape and disposition, forces the stops 17 inwardly down the slope 85 on the ring 60 until this shoulder surface 281 clears the stops, whereupon the spring 63 returns the stops and the parts moving with them so that the stops mount the slope 85 and are forced outwardly thereby to engage the shoulder surface 281 of the next adjacent groove 20. The action is then repeated, the arrangement operating somewhat like a pawl and ratchet, until the sleeve 19 moves clear of the stops. The ram 12 is then free to move to the coarse pitch end of its range of movement in which the blades are feathered.

It will be appreciated that in the construction just described, by suitably selecting the rate and dimensions of the valve spring means 45 it could be arranged that the locking mechanism be held in its inoperative state only by a fine pitch pressure supply sufficient to move the blades in the pitch fining direction under the control of the constant speed unit. In these circumstances, the locking mechanism would be brought to its operative state whenever the pressure supply to move the blades in the pitch fining direction was relieved. With such an arrangement the sleeve 19 would then have to "ratchet" over the stops in moving in the pitch coarsening direction under the control of the constant speed unit as previously described in connection with the operation of the airscrew when moving the blades to a feathered position.

Referring now to Figure 3, the airscrew shown thereby comprises a hub 111 upon which are journalled four propeller blades, of which the root 112 of one is shown. The blades are journalled so as to be rotatable about their longitudinal pitch change axes 113. Each blade root has secured to it a crankpin 114 which is coupled by connecting rods 115 and 116 to a ram 117 slidable in a cylinder 118 secured to the forward end (i.e. the left hand end in the drawing) of the hub 111 and coaxial with the driving shaft 119. The ram 117 and cylinder 118 together form a pitch change motor the ram being movable forwardly of the hub, that is, to the left in the drawing, to move the blades towards fine pitch, and rearwardly of the hub, that is, to the right in the drawing, to move the blades towards coarse pitch.

The ram 117 is of annular form and, on its inner diameter, is slidable upon a stationary barrel 120 which houses the locking mechanism according to the invention. This mechanism includes a ring 121 which carries a ring of resilient outspringing fingers 123. Each finger 123 carries a radially outwardly projecting stop 122 at its forward end. The stops 122 are provided on their outer peripheral surface with V-sectioned formations 124. Radial inward movement of the stops 122 is controlled by stop retaining means in the form of a retaining member or ring 125 having a cylindrical stepped outer periphery having three different diameters 126, 127 and 128 and which is slidably mounted upon a stop release piston assembly generally indicated at 130. The stops 122 project through a circumferential gap 131 in the wall of the barrel 120 into the path of the ram 117. The forward part of the ram comprises a sleeve 132, the internal diameter 133 of which is a sliding fit on the barrel 120. The internal diameter 133 is stepped at 137 so that forward of this step it is slightly larger, referred to hereinafter as diameter 136. Step 137 is set at an angle of approximately 60° to the surface of the barrel 120. From step 137 to the forward end of the sleeve, the sleeve is provided with a number of circumferential V-sectioned grooves 138 between V-sectioned shoulders or ridges as previously described. The slope of the forward facing shoulder surface 200 of each groove is less than the rearwardly facing shoulder surface 201 of the groove, the angles thereof being approximately 30° and 60° respectively to the surface of the barrel 120. The formations 124 are shaped to conform with grooves 138 so that under certain conditions, as will be explained hereinafter, the projections 124 may engage the grooves to lock the ram of the pitch change motor against movement relatively to the cylinder of the pitch change motor corresponding to movement of the blades in the pitch fining direction.

A channel 139 passes through the driving shaft 19 into the propeller hub.

This channel is used to convey coarse pitch pressure fluid to the forward side of the ram 117 of the pitch change motor via a channel 140, annular chamber 141, through the clearance between the resilient fingers 123 and through the gap 131 to move the ram 117 towards coarse pitch.

A further channel 142 passes through the driving shaft 119 and this is used to convey fine pitch pressure fluid to the rearward side of the ram 117 via annular chamber 143 and radial ports 144, to move the ram towards fine pitch.

A third channel 145 generally referred to as the "third oil-way," passes through the driving shaft 119 and leads through a channel 146 to a mechanism for breaking down the fine pitch stop incorporated in the propeller.

A core 147 supported co-axially with and within the barrel 120 is provided with a bore 148 which opens at its rearward end into a chamber which is divided into two parts 149 and 150 by a radial flange 151 at the rearward extremity of a tubular member 152. This tubular member is coaxial with the bore 148 and extends forwardly beyond the forward end of the bore and opens into a chamber 153. A valve member 154 is slidably mounted upon the tubular member 152 and within the bore 148 and a step 155 is provided in the bore to limit forward movement of the valve member. A shoulder 156 is provided in the bore adjacent the chamber 149 to limit rearward movement of the valve member. A valve spring means in the form of coil spring 157 is interposed between the forward end of the bore 148 and the forward part of the valve member 154. When the valve member is in its rearmost position, i.e. against shoulder 156, radial ports 158 in the valve member align with channels 159 in the core 147, while when the valve member is in its forward position radial ports 160 align with these channels. Ports 158 and 160 respectively open from the space forward and the space behind the valve member. Channel 146, previously referred to, opens into chamber 150, and thus into the interior of the tubular member 152. Radial ports 161 in the tubular member place the interior thereof in communication with the annular space, i.e. bore 148 surrounding it.

A passage 162 leads from annular chamber 143 into chamber 149.

Integral with the outside of the core 147 at its centre part is a radial flange 163 having a forwardly axially extending cylindrical part 164 at its periphery. The outer surface of the core 147 is cylindrical at its centre part 147a, and an annular piston 165 is slidably mounted thereon and within the cylindrical part 164. This annular piston is provided with a forwardly, axially extending cylindrical part 166 at its periphery, the part 166 having a radially outwardly projecting flange 167 which forms a stop for the piston when it abuts against the forward extremity of the cylindrical part 164. A suitable distance forward of the flange 163 is a flange 168 fixed with respect to the core 147, and the flange 168 supports the cylindrical part 166 and with it forms an enclosed cylindrical chamber, generally indicated at 169, in which the piston 165 is reciprocable, the piston 165 and the chamber 169 together forming an hydraulic jack means actuable to move the stop retaining means later described to an inoperative position as also later described to the rear of piston 165 while further channels 170 lead from the bore 148 to the forward side of this piston.

Towards the forward part of the core 147, its diameter is somewhat reduced and a tubular member 171 is slidably mounted on this reduced diameter portion of the core. At its rearward end the tubular member 171 is provided with a radial flange 171a.

The flange 171a forms a stop for the retaining ring 125 which is slidably mounted upon the tubular member 171. The tubular member 171 is the piston rod of the stop release piston assembly 130 previously referred to. The forward end of the tubular member 171 is provided with an outwardly directed radial flange which forms the lock withdrawal piston 172. The peripheral part 173 of this flange is somewhat enlarged and is a sliding fit in the forward end of the barrel 120. Rearward movement of the lock withdrawal piston 172 is limited by a radially inwardly extending flange 174 integral with the inner wall of the barrel 120. The internal diameter of this flange is somewhat greater than the outside diameter of the tubular member 171, and at this diameter the flange is provided, integral therewith, with a cylindrical part 175 coaxial with and spaced from the tubular member 171 so as to form a chamber 176 therebetween. The rearward end of this chamber is closed by an inwardly directed radial flange 177 at the rearward end of the cylindrical part 175.

Radial passages 178 place the chamber 153 in communication with an annulus 179 on the internal surface of tubular member 171 and ports 180 therefrom lead into chamber 176.

It will thus be seen that when the lock withdrawal piston 172 is moved forwardly, the retaining ring 125, being mounted on the tubular member 171, also moves forwardly against the pressure of a coil spring 181. Consequently the inwardly directed part of each stop 122 would then no longer engage on the diameter 126 of the ring 125.

The forward end of the coil spring 181 seats against an inwardly directed flange 182 which is formed at the forward extremity of a sleeve 183.

This sleeve is provided with slots as at 184 and is stepped and increased somewhat in diameter halfway along its length. This step 185, co-operates with the flange 167 to limit the forward movement of the piston 165. At its rearmost end, the sleeve 183 fits within the ring 121 and is provided with radially extending projections 186 which interengage with slots 187 at the rearmost end of the ring 121. The ring 121 and the sleeve 183 are together slidable rearwardly against the pressure of coil spring 181. Radial ports 188 provided in member 183 place chamber 141 in communication with the forward side of the ram 117, while radial ports 189 place the chamber 190 forward of the lock withdrawal piston 172 in communication also with the forward side of the ram.

The airscrew just described operates in a similar manner to that described with reference to Figures 1 and 2 of the drawings. In its position as shown the ram 117 is in its position corresponding to a feathered position of the blades.

When it is desired to move the blades into the normal operating pitch change range of movement the coarse pitch oil which has been delivered by a feathering pump is relieved, and the constant speed unit which controls the pitch of the airscrew during normal operation of the airscrew permits fine pitch oil to pass via channel 142, annular chamber 143, ports 144 and to the fine pitch side of the pitch change motor so as to move the ram in the forward direction corresponding to movement of the blades in the pitch fining direction, the oil on the coarse pitch side of the pitch change motor exhausting to drain via the gap 131, radial ports 188, annular chamber 141, channel 140 and channel 139. At the same time, fine pitch oil passes through channels 162 into the chamber 149 and displaces the valve member 154 against the action of the spring 157. The ports 160 in the valve member are thus aligned with the channels 159 and the fine pitch oil pressure is communicated with the rearward side of the jack piston 165 which is displaced to the left in the drawing against the drain oil pressure maintained in the bore 148. As the piston 165 moves it abuts against the ring 125, and the piston 165 and the ring then move forwardly together against the action of the spring 181, the ring sliding on the tubular member 171, until the flange 167 abuts against the step 185. In this position the diameter 127 of the ring 125 lies immediately within the ring of stops 122 and the stops may therefore be pushed radially inwardly against the action of the outspringing fingers 123 by the shoulder surfaces 200 on the ram as the ram moves in the pitch fining direction.

Furthermore it is arranged that the pressure of fluid on the fine pitch side of the pitch change motor is always sufficient, during normal operation of the airscrew, to hold the valve member 154 displaced to the left in the drawing against the action of the spring 157, as previously described.

During normal operation therefore the ram is free to move in either direction along the barrel the V-sectioned shoulders on the ram clicking over the corresponding V-sectioned formations 124 on the stops.

Movement of the ram in the pitch fining direction under the control of the constant speed unit is limited by the shoulder surface 137 coming up against the stops 122, the stops in this case acting as a fine pitch stop.

In order to break down this fine pitch stop, oil at high pressure is supplied through the "third oil way" 145, which is normally communicated with drain pressure. This high pressure oil passes through channel 146, chamber 150, the interior of the tubular member 152, chamber 153, radial passages 178, annulus 179 and ports 180 into chamber 176 to the rear of the lock withdrawal piston 172. Consequently the piston 172, the tubular member 171 and the retaining ring 125 are moved forwardly against the action of the spring 181 until the diameter 128 of the ring 125 lies immediately within the ring of stops 122. The "third oil way" pressure is also transmitted to the forward side of the jack piston 165, but this pressure is insufficient to move the jack piston against the fine pitch pressure so that the jack piston remains in a forward position.

With the diameter 128 of the ring lying immediately within the ring of stops 122 the ram 117 is free to move forward beyond the stops 122 into superfine or reverse pitch, the shoulder surface 137 being able to force the stops inwardly on to the diameter 128.

If there is a failure in the drive to the constant speed unit or failure in either coarse or fine pitch oil line 139 or 142 during the normal operation of the propeller resulting in a fall in the pressure of fluid on the fine pitch side of the pitch change motor and consequently a drop of pressure in the chamber 149 below a predetermined normal operating minimum value the valve member 154 moves to the right in its bore 148 under the action of the spring 157, until it abuts the shoulder 156. Consequently ports 158 in valve member 154 align with channels 159 and therefore both forward and rearward sides of the piston 165 are subjected to drain oil pressure through ports 161, the interior of tubular member 152, chamber 150, channel 146 and channel 145. The retaining ring therefore pushes the piston 165 to its rearmost position, under the control of the coil spring 181 so that the greatest diameter step 126 engages with the ring of stops 122 and holds the stops out so that the V-sectioned formations 124 on the stops engage one or more of the shoulder surfaces 200, if not immediately, then as soon as the blades have fined off to a sufficient extent to bring the first shoulder surface 200 against the rearmost rearwardly directed face of the stops.

The blades are therefore prevented from fining off to any dangerous extent, upon failure of normal constant speed control of the airscrew.

If, following such failure, it is required to feather the blades, coarse pitch fluid is supplied from feathering pump to the channel 139. The ram then moves rearwardly taking with it the stops 122, the fingers 123, the ring 121 together with the sleeve 183, until the step 185 in the sleeve 183 abuts against the radial flange 167. The stops 122 by this time have been pushed onto the diameter 127 of the ring 125 and the V-sectioned formations on the stops therefore disengage the shoulder surfaces 201 of the V-sectioned grooves in the ram with which they are engaged, and re-engage the next adjacent shoulder surfaces 201, the spring 181 returning the stops and the parts moving with them so that the stops are again engaged by the diameter 126 of the ring 125. The action is then repeated until the ram moves on past the stops and then into its feathered position.

We claim:

1. In a variable pitch airscrew comprising a hub, a plurality of airscrew blades rotatably mounted in the hub for pitch changing movements about their longitudinal pitch change axes, and a double acting hydraulic pitch change motor having a fine pitch side and a coarse pitch side, said motor comprising two elements movable relatively to one another by hydraulic fluid under pressure to adjust the pitch of the blades, locking means for locking the elements of the pitch change motor against movement relatively to one another, corresponding only to movement of the blades in the pitch fining direction into fine pitch, hydraulic jack means operable to render said locking means inoperative, a source of hydraulic fluid under pressure sufficient to operate said jack means, valve means for controlling the passage of hydraulic fluid from said source to said jack means, said valve means including a valve body displaceable in a valve chamber against the action of spring means from a closed position in which said jack means is closed off from said source to an open position in which said jack means is communicated with said source, fluid conduit means connecting said valve chamber on one side of said valve body with the fine pitch side of the pitch change motor through which fluid conduit means the pressure of fluid on the fine pitch side of the pitch change motor is at all times able to act on said valve body in the sense to displace it to its open position and to hold said valve body displaced when the pressure of fluid on the fine pitch side of the pitch change motor is above a predetermined value.

2. In a variable pitch airscrew comprising a hub, a plurality of airscrew blades rotatably mounted in the hub for pitch changing movements about their longitudinal pitch change axes, and a double acting hydraulic pitch change motor having a fine pitch side and a coarse pitch side, said motor comprising two elements movable relatively to one another by hydraulic fluid under pressure to adjust the pitch of the blades, locking means for locking the elements of the pitch change motor against movement relatively to one another, corresponding only to movement of the blades in the pitch fining direction into fine pitch, hydraulic jack means operable to render said locking means inoperative, a source of hydraulic fluid under pressure sufficient to operate said jack means, valve means for controlling the passage of hydraulic fluid from said source to said jack means, said valve means including a valve body displaceable in a valve chamber against the action of spring means from a closed position in which said jack means is closed off from said source to an open position in which said jack means is communicated with said source, fluid conduit means connecting said valve chamber on one side of said valve body with the fine pitch side of the pitch change motor through which fluid conduit means the pressure of fluid on the fine pitch side of the pitch change motor is at all times able to act on said valve body in the sense to displace it to its open position and to hold said valve body displaced when the pressure of fluid on the fine pitch side of the pitch change motor is at and above its normal operating minimum value.

3. An airscrew as claimed in claim 1, wherein said pitch change motor comprises a ram and a cylinder, and said locking means comprises a series of shoulders on said ram spaced apart in the direction of relative movement of said ram and cylinder, a stop movable between an inoperative position out of the path of movement of said series of shoulders during relative movement of the ram and cylinder and an operative position in said path, and stop retaining means which in a first position relative to said stop engages and holds said stop in the path of relative movement of said shoulders, and in a second position relative to said stop allows said stop to be moved to its inoperative position.

4. An airscrew as claimed in claim 3, wherein said stop retaining means is displaceable between its said first and second positions relative to said stop, to its said second position, by said jack means, against the action of a spring urging said stop retaining means to its said first position, the airscrew comprising duct means connecting said jack means with the fine pitch side of the pitch change motor through said valve means, the fine pitch side of the pitch change motor constituting said source.

5. An airscrew as claimed in claim 4, wherein said stop is a fine pitch stop, the airscrew comprising means for displacing said stop retaining means independently of movement of said jack means to render the fine pitch stop ineffective.

6. An airscrew as claimed in claim 5, wherein said displacing means comprises a second hydraulic jack means and duct means connecting said second jack means with the fine pitch side of the pitch change motor, said second jack means being operable only by fine pitch pressure fluid supplied to the pitch change motor at a pressure greater than the normal operating maximum value.

7. An airscrew as claimed in claim 5, wherein said displacing means comprises a second hydraulic jack means, duct means connecting said second jack means with a source of fluid under pressure which source is separate of the pitch change motor, and valve means for controlling the passage of hydraulic fluid from the source through the duct means to said second jack means.

8. An airscrew as claimed in claim 4, wherein each shoulder of said series of shoulders has a first shoulder surface to engage said stop when it is in its operative position to prevent movement of the ram relative to the cylinder of the pitch change motor to move the blades in the pitch fining direction, and a second shoulder surface, opposed to the first shoulder surface, to engage and displace the stop against the action of said spring, when said locking means is in its operative position and when the ram is moved relatively to the cylinder of the pitch change motor to move the blades towards coarse pitch, to change the position of said stop retaining means relative to said stop from its said first position relative to said stop to its said second position relative to said stop, each of the second shoulder surfaces being so shaped and disposed that the relative movement of the ram forces the stop to its inoperative position against the action of said spring when said stop is displaced as aforesaid so that said stop disengages the second shoulder surface of each of said shoulders in turn and is re-engaged with the second shoulder surface of the next adjacent shoulder by the action of said spring which returns said stop to change the position of said stop retaining means from its said second position relative to said stop to its said first position relative to said stop.

9. An airscrew as claimed in claim 8, wherein said pitch change motor comprises an annular ram slidable on a hollow cylindrical barrel arranged co-axially with the outer wall of the cylinder of the pitch change motor, and said shoulders are formed on the inner surface of a cylindrical portion of said ram having a diameter greater than said barrel and arranged co-axially with and surrounding the barrel.

10. An airscrew as claimed in claim 9, wherein said locking means comprises a ring of said stops projecting through a circumferential gap in said barrel, said stops each being formed at the free end of a resilient finger, and the resilient fingers being carried within the barrel by a collet ring slidably mounted therein to allow said stops to be displaced by said ram relatively to said stop retaining means.

11. An airscrew as claimed in claim 10, wherein a core is supported co-axially with and within said barrel, and said stop retaining means comprises a stop retaining member slidably carried from said core, said member having a cylindrical stepped outer periphery having at least two steps one of larger diameter than the other, and being slidable between a position in which the larger diameter step is engaged within said ring of stops and holds said stops in their operative position and a position in which said stops are free to move radially inwardly to their inoperative position in which they engage said smaller diameter step.

12. An airscrew as claimed in claim 11, wherein said resilient fingers project from said collet ring forwardly of said barrel, and a sleeve is provided within and slidable with said collet ring, said sleeve extending forwardly of the barrel and enclosing said stop retaining member, said sleeve having an inwardly directed flange at its forward end, and said spring is engaged between said flange and said stop retaining member, the sleeve being provided with elongated slots in the region of said stops, and said stops each having a radially inwardly projecting part passing through one of said slots to co-operate with said stop retaining member.

13. An airscrew as claimed in claim 11, wherein said first said jack means comprises an annular piston slidable on said core, and said piston is provided with a cylindrical part which projects forwardly of said core to engage and displace said ring member when said first said jack means is operated.

14. An airscrew as claimed in claim 13, wherein said cylindrical part has a radially outwardly projecting circumferential flange which engages a step in the inner surface of said sleeve to limit the forward movement of said jack piston when said first said jack means is operated.

15. An airscrew as claimed in claim 14, wherein said ram is slidable rearwardly of said barrel to move said blades towards coarse pitch, and the step in the inner surface of said sleeve forms with said radially outwardly directed flange a stop limiting the displacement of said sleeve and said collet ring by said ram, when said stops are engaged with the second shoulder surface of one of said shoulders and said ram is moved rearwardly of said barrel.

References Cited in the file of this patent
UNITED STATES PATENTS

| | | |
|---|---|---|
| 2,343,416 | Keller | Mar. 7, 1944 |
| 2,542,463 | Beard | Feb. 20, 1951 |
| 2,592,124 | Diefenderfer | Apr. 8, 1952 |
| 2,652,122 | Longfellow | Sept. 15, 1953 |
| 2,655,999 | Basevi | Oct. 20, 1953 |
| 2,703,148 | Pearl | Mar. 1, 1955 |